(12) United States Patent
Park et al.

(10) Patent No.: US 8,442,576 B2
(45) Date of Patent: May 14, 2013

(54) MOBILE TELECOMMUNICATION DEVICE AND EVENT PROCESSING METHOD USING THE SAME

(75) Inventors: Yeon Woo Park, Seoul (KR); Sang Yeon Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 400 days.

(21) Appl. No.: 12/542,248

(22) Filed: Aug. 17, 2009

(65) Prior Publication Data

US 2010/0056189 A1 Mar. 4, 2010

(30) Foreign Application Priority Data

Sep. 3, 2008 (KR) .................. 10-2008-0086723

(51) Int. Cl.
*H04M 1/00* (2006.01)
(52) U.S. Cl.
USPC ........ 455/550.1; 455/416; 455/466; 455/518; 455/519; 455/520; 715/753; 715/758; 709/204; 709/205
(58) Field of Classification Search ............... 455/550.1, 455/416, 466, 418–420; 715/758, 753; 709/204, 709/205
See application file for complete search history.

(56) References Cited

U.S. PATENT DOCUMENTS

| | | |
|---|---|---|
| 2004/0015548 A1 | 1/2004 | Lee |
| 2006/0148512 A1 | 7/2006 | Ekholm et al. |
| 2008/0104169 A1* | 5/2008 | Combel et al. ................ 709/204 |
| 2011/0029898 A1* | 2/2011 | Malik .......................... 715/758 |

FOREIGN PATENT DOCUMENTS

| | | |
|---|---|---|
| CN | 101155360 A | 4/2008 |
| WO | WO-2007/131331 A1 | 11/2007 |

* cited by examiner

*Primary Examiner* — Fayyaz Alam
(74) *Attorney, Agent, or Firm* — Birch, Stewart, Kolasch & Birch, LLP

(57) ABSTRACT

A mobile communication terminal including a wireless communication unit configured to wirelessly communicate with at least one other terminal, an application driving unit configured to implement a chatting session with the at least one other terminal using the wireless communication unit, a display unit configured to display chatting information according to an operation of the application driving unit, and a controller configured to control the display unit to display a chatting screen including information on an event external to the chatting session that occurs during the chatting session and to maintain displaying the chatting screen.

20 Claims, 14 Drawing Sheets

(Terminal A)

(Terminal B)

United States Patent US 8,442,576 B2

MOBILE TELECOMMUNICATION DEVICE AND EVENT PROCESSING METHOD USING THE SAME

This application claims the benefit of the Korean Patent Application No. 10-2008-0086723, filed on Sep. 3, 2008, which is hereby incorporated by reference as if fully set forth herein.

BACKGROUND OF THE INVENTION

1. Field of the Invention

The present invention relates to a mobile communication terminal and corresponding method for processing an external event occurring during a chatting session.

2. Discussion of the Related Art

A mobile communication terminal can perform various additional functions as well as a voice communication function. For example, a user can use his or her mobile terminal to perform real-time chatting or video chatting. However, the chatting service is limited in nature making it inconvenient for the user.

SUMMARY OF THE INVENTION

Accordingly, one object of the present invention is to address the above-noted and other problems.

Another object of the present invention is to provide a mobile communication terminal and corresponding event processing method for displaying event information while maintaining the chatting screen when an external event requiring a text representation occurs in the course of the chatting session.

Another object of the present invention is to provide a mobile communication terminal and corresponding method for easily writing a reply message.

Yet another object of the present invention is to provide a mobile communication terminal and corresponding method for sharing a message received during the chatting session with a chatting correspondent party.

To achieve these objects and other advantages and in accordance with the purpose of the invention, as embodied and broadly described herein, the present invention provides in one aspect a mobile communication terminal including a wireless communication unit configured to wirelessly communicate with at least one other terminal, an application driving unit configured to implement a chatting session with the at least one other terminal using the wireless communication unit, a display unit configured to display chatting information according to an operation of the application driving unit, and a controller configured to control the display unit to display a chatting screen including information on an event external to the chatting session that occurs during the chatting session and to maintain displaying the chatting screen.

In another aspect, the present invention provides a method of controlling a mobile communication terminal, and which includes wirelessly communicating, via a wireless communication unit, with at least one other terminal, implementing a chatting session with the at least one other terminal using the wireless communication unit, displaying, via a display unit, chatting information according to the chatting session, and displaying, via the display unit, a chatting screen including information on an event external to the chatting session that occurs during the chatting session and maintaining displaying the chatting screen.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The mobile terminal according to exemplary embodiments of the present invention will now be described with reference to the accompanying drawings.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, the configuration according to the embodiments of the present invention can be also applicable to the fixed types of terminals.

Figure 1:
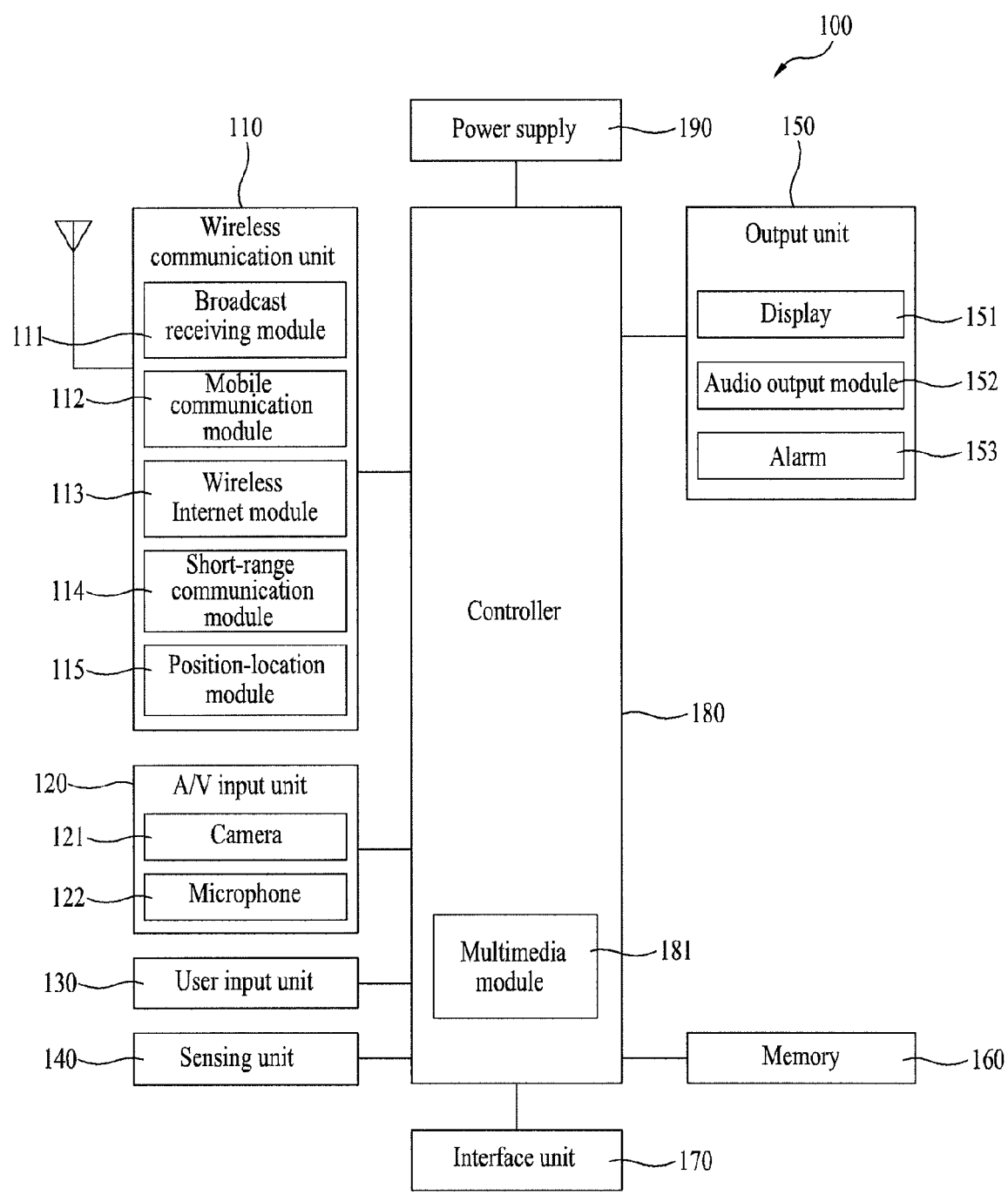
FIG. 1 is a schematic block diagram of a mobile terminal according to an embodiment of the present invention.

FIG. 1 is a block diagram illustrating a mobile terminal according to one embodiment of the present invention. As shown, the mobile terminal 100 may include components such as a wireless communication unit 110, an Audio/Video (A/V) input unit 120, a user input unit 130, a sensing unit 140, an output unit 150, a memory 160, an interface unit 170, a controller 180, a power supply 190 and the like. Further, FIG. 1 shows the mobile terminal 100 having various components, but it is understood that implementing all of the illustrated components is not a requirement. Greater or fewer components may alternatively be implemented.

In addition, the wireless communication unit 110 may include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114 and a position location module 115.

The broadcast receiving module 111 receives a broadcast signal and/or broadcast associated information from an external broadcast managing entity via a broadcast channel. The broadcast channel may include a satellite channel and a terrestrial channel. Further, the broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like.

The broadcast signal may be implemented as a TV broadcast signal, a radio broadcast signal, and a data broadcast signal, among others. The broadcast signal may further include a data broadcast signal combined with a TV or radio broadcast signal. Also, the broadcast associated information may be provided via a mobile communication network, and received by the mobile communication module 112. In addition, the broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the like. The broadcast receiving module 111 may be configured to be suitable for all broadcast system transmitting broadcast signals as well as the digital broadcasting systems. Broadcast signals and/or broadcast associated information received via the broadcast receiving module 111 may also be stored in a suitable device, such as a memory 160.

Further, the mobile communication module 112 transmits/receives wireless signals to/from at least one of network entities (e.g., base station, an external mobile terminal, a server, etc.) on a mobile communication network. In addition, the wireless signals may include audio call signal, video call signal, or various formats of data according to transmission/reception of text/multimedia messages. Also, the wireless Internet module 113 supports wireless Internet access for the mobile terminal, and may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

Further, the short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like. The position location module 115 denotes a module for detecting or calculating a position of a mobile terminal. An example of the position location module 115 may include a Global Position System (GPS) module.

In addition, the GPS module may receive position information in cooperation with associated multiple satellites. Further, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

In addition, the A/V input unit 120 is configured to provide audio or video signal input to the mobile terminal. The A/V input unit 120 may include a camera 121 and a microphone 122. Further, the camera 121 receives and processes image frames of still pictures or video obtained by image sensors in a video call mode or a capturing mode. The processed image frames may then be displayed on a display unit 151 (hereinafter referred to as the display 151).

Also, the image frames processed by the camera 121 may be stored in the memory 160 or transmitted to the exterior via the wireless communication unit 110. Two or more cameras 121 may be provided according to the configuration of the mobile terminal. The microphone 122 may receive an external audio signal via a microphone while the mobile terminal is in a particular mode, such as a phone call mode, a recording mode, a voice recognition mode, or the like. This audio signal is processed into digital data, and the processed digital data is converted for output into a format transmittable to a mobile communication base station via the mobile communication module 112 for the phone call mode. The microphone 122 may also include assorted noise removing algorithms to remove noise generated in the course of receiving the external audio signal.

In addition, the user input unit 130 may generate input data input by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen. Further, the sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100.

For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Here, the sensing unit 140 may include a proximity sensor 141.

In addition, the interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

In addition, the interface unit 170 may receive data from an external device, or be provided with power and accordingly transfer the received data or power to each component within the mobile terminal 100 or transfer data of the mobile terminal 100 to an external device. Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals and power inputted from the cradle may operate as a signal for recognizing that the mobile terminal 100 has accurately been mounted to the cradle.

The output unit 150 is configured to output an audio signal, a video signal or an alarm signal, and may include the display 151, an audio output module 152, an alarm 153, and the like. Further, the display 151 may output information processed in the mobile terminal 100. For example, when the mobile terminal is operating in a phone call mode, the display 151 provides a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

Meanwhile, as mentioned above, a touch screen can be configured as the display 151 and the touchpad are layered with each other to work in cooperation with each other. This configuration permits the display 151 to function both as an input device and an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays according to embodiments of the present invention can be configured to be transparent such that it is possible to see the exterior therethrough. These displays may be called transparent displays. A representative example of the transparent display may include a Transparent Organic Light Emitting Diode (TOLED), and the like. Further, the mobile terminal 100 may include two or more of such displays 151. For example, the mobile terminal 100 may simultaneously include an external display (not shown) and an internal display (not shown).

Further, the audio output module 152 may output audio data which is received from the wireless communication unit 110 in various modes including a call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

In addition, the alarm 153 may output a signal to inform a generation of event associated with the mobile terminal 100. Alarm events may include a call received, message received, user input received and the like. In addition to generating the audio or video signal, the alarm 153 may also inform the event generation in different manners, for example, by providing tactile sensations (e.g., vibration) to a user. The alarm 153 may also be configured to vibrate responsive to the mobile terminal receiving a call or message. As another example, vibration is provided by the alarm 153 responsive to receiving user input at the mobile terminal, thus providing a tactile feedback mechanism. Such vibration can also be provided to make a user recognize the event generation. The signal informing the event generation may be output via the display 151 or the audio output module 152.

Further, the memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio outputted upon the touch input on the touch screen. In addition, the memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

In addition, the controller 180 generally controls the overall operations of the mobile terminal. For example, the controller 180 performs the control and processing associated with voice calls, data communications, video calls, and the like. The controller 180 may also include a multimedia module 181 which provides multimedia playback. The multimedia module 181 may be configured as part of the controller 180 or as a separate component. The controller 180 can also perform a pattern recognition processing so as to recognize writing or drawing input on the touch screen as text or image. Further, the power supply 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The internal components of the mobile terminal related to an embodiment of the present invention have been described from the perspective of their functions. Hereinafter, external components of the mobile terminal related to an embodiment of the present invention will be described from the perspective of their functions with reference to FIGS. 2 and 3. Further, the mobile terminal may be implemented in a variety of different configurations. Examples of such configurations include a folder type, slide type, bar type, rotating type, swing type or the like. The present description in FIGS. 2 and 3 relates to a slide-type mobile terminal, but the present invention is not limited to the slide-type mobile terminal, and can be applied to other types of terminals including the above-mentioned types of terminals.

Figure 2:
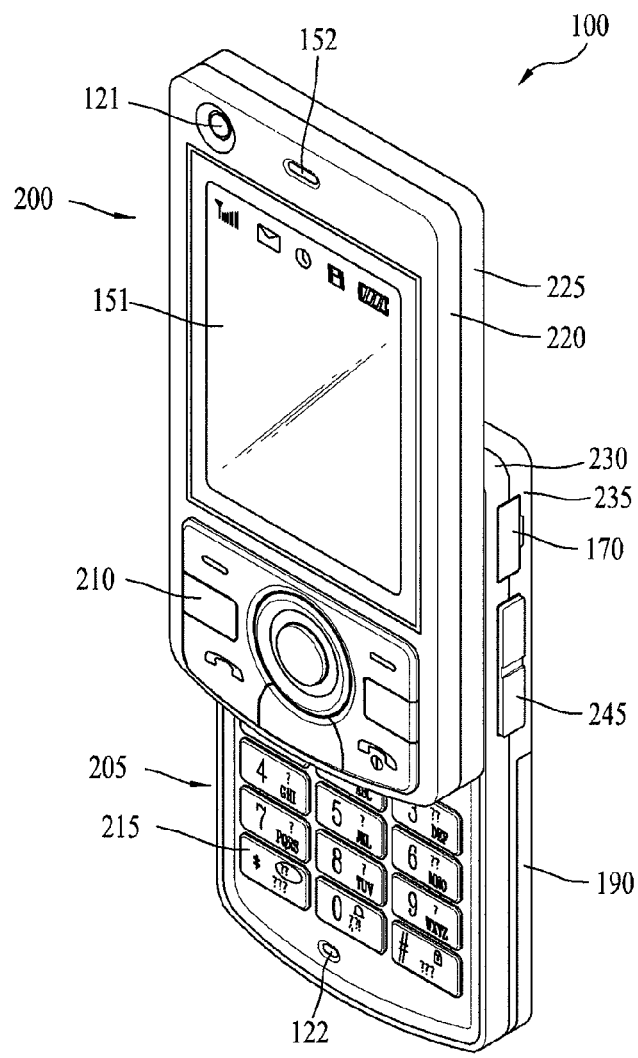
FIG. 2 is a front perspective view of a mobile terminal according to an embodiment of the present invention.

FIG. 2 is a front perspective view of a mobile terminal according to an embodiment of the present invention. As shown, the mobile terminal 100 includes a first body 200, and a second body 205 configured to slidably cooperate with the first body 200 in at least one direction. For a folder-type mobile terminal, the mobile terminal 100 may include the first body 200, and the second body 205 configured to have at least one side folded or unfolded with respect to the first body 200.

Also, the first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an opened configuration (position). In addition, when the mobile terminal is a folder-type mobile terminal including a first body and a second body having one side folded or unfolded with respect to the first body, the folded state of the second body can be referred to as the closed configuration, whereas the unfolded state of the second body can be referred to as the open configuration.

In addition, when the mobile terminal is a swing-type mobile terminal including a first body and a second body capable of being swung with respect to the first body, the state that the first body is overlapped with the second body can be referred to as the closed configuration whereas the state that the second body is swung thus to make the first body partially exposed can be referred to as the open configuration. Also, even though a specific description is not given of the folder-type mobile terminal and the swing-type mobile terminal with respect to FIGS. 2 and 3, it can be easily understood by those skilled in the art and thus a detailed description thereof will not be repeated.

In addition, the mobile terminal may be operable in a standby (idle) mode when in the closed configuration, but this mode can be released by the user's manipulation. Also, the mobile terminal may be operable in an active (phone call) mode in the open configuration. This mode may also be changed into the idle mode according to the user's manipulation or after a certain time elapses. As shown in FIG. 2, a case (housing, casing, cover, etc.) forming the outside of the first body 200 is formed by a first front case 220 and a first rear case 225. In addition, various electronic components may be disposed in a space between the first front case 220 and the first rear case 225. One or more intermediate cases may additionally be disposed between the first front case 220 and the first rear case 225.

Further, the cases can be formed of resin in a manner of injection molding, or formed using metallic materials such as stainless steel (STS) and titanium (Ti). Also, a display 151, an audio output module 152, a camera 121 or a first user input unit 210 may be disposed at the first front case 220 of the first body 200. In addition, the display 151 may include LCD, OLED, and the like, which can visibly display information. The display 151 and a touchpad can also be layered with each other such that the display 151 can be configured to function as a touch screen so as to allow a user to input information in a touching manner.

Further, the audio output module 152 may be implemented as a speaker, and the camera 121 may be implemented to be suitable for a user to capture still images or video. In addition, like the first body 200, a case configuring the outside of the second body 205 may be formed by a second front case 230 and a second rear case 235. Also, the second user input unit 215 may be disposed at the second body 205, and in more detail, at a front face of the second front case 230. A third user input unit 245, a microphone 122 and an interface unit 170 may also be disposed either at the second front case 230 or at the second rear case 235.

Further, the first to third user input units 210, 215 and 245 may be referred to as a user input unit 130. Any tactile manner that a user can touch, e.g., the display 151, for manipulation can be employed for the user input unit 130. For example, the user input unit 130 can be implemented as a dome switch or touchpad which a user can input information in a pushing or touching manner, or implemented in a manner of using a wheel, a jog or a joystick to rotate keys.

Regarding each function, the first user input unit 210 can be used for inputting commands such as START, END, SCROLL or the like, and the second user input unit 215 can be used for inputting numbers, characters, symbols, or the like. The first user input unit 210 may also include so-called soft keys used in cooperation with icons displayed on the display module 151, and navigation keys (usually composed of four navigation keys and a central key) for indicating and confirming an orientation. Also, the third user input unit 245 can be operated as a hot key for activating a specific function within the mobile terminal, and the microphone 122 may be implemented to be suitable for receiving user's voice or various sounds.

In addition, the interface unit 170 may be used as a passage through which the terminal related to the present invention can exchange data or the like with an external device. For example, the interface unit 170 may be implemented as one of a wired/wireless connection port for connecting an earphone to the mobile terminal, a port for short-range communications (e.g., an Infrared Data Association (IrDA) port, a BLUETOOTH port, a wireless LAN port, etc.), power supply ports for providing power to the mobile terminal, or the like.

The interface unit 170 can be a card socket for receiving an external card, such as a Subscriber Identity Module (SIM), a User Identity Module (UIM), a memory card for storing information, or the like. The power supply 190 may be disposed at a side of the second rear case 235 to provide power to the mobile terminal, and may be a rechargeable battery, for example, to be attachable/detachable for charging.

Figure 3:
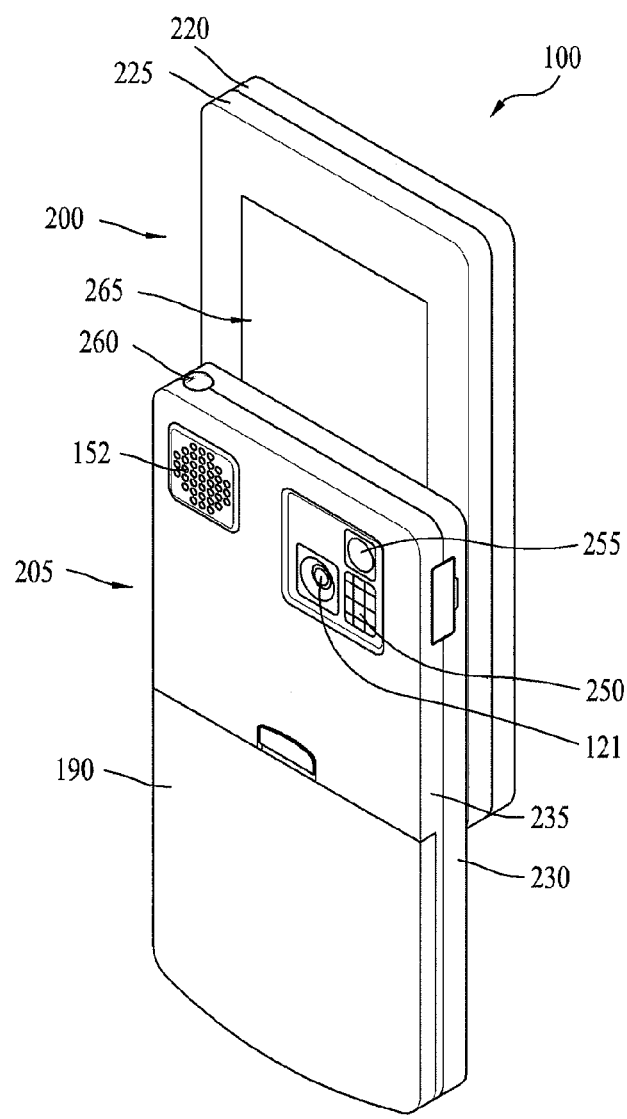
FIG. 3 is a rear perspective view of a mobile terminal according to an embodiment of the present invention.

Next, FIG. 3 is a rear perspective view of the mobile terminal according to an embodiment of the present invention. As illustrated in FIG. 3, a camera 121 may further be disposed at a rear face of the second rear case 235 of the second body 205. In addition, the camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the camera 121 of the first body 200 may be useful when a user can capture his face and send it to another party during a video call or the like. On the other hand, the camera 121 of the second body 205 may operate with a relatively higher pixels (higher resolution) such that it can be useful for a user to obtain higher quality pictures for later use. Also, a flash 250 and a mirror 255 may additionally be disposed adjacent to the camera 121 of the second body 205. The flash 250 operates in conjunction with the camera 121 of the second body 250 when taking a picture using the camera 121 of the second body 205. In addition, the mirror 255 can cooperate with the camera 121 of the second body 205 to allow a user to photograph himself in a self-portrait mode.

The second rear case 235 may further include an audio output module 152. Also, the audio output module 152 of the second body 205 can cooperate with the audio output module 152 of the first body 200 to provide stereo output. In addition, the audio output module 152 may be configured to operate as a speakerphone. A broadcast signal receiving antenna 260 may also be disposed at one side of the second rear case 235, in addition to an antenna for communications. The antenna 260 can be configured to retract into the second body 205. One part of a slide module 265 which allows the first body 200 to be slidably coupled to the second body 205 may be disposed at the first rear case 225 of the first body 200.

Further, the other part of the slide module 265 may be disposed at the second front case 230 of the second body 205, such that it may not be exposed to the exterior as illustrated in the drawing of the present invention. As such, it has been described that the camera 121 is disposed at the second body 205; however, the present invention may not be limited to the configuration. For example, it is also possible that one or more of those components (e.g., 260, 121~250, 152, etc.), which have been described to be implemented on the second rear case 235, such as the camera 121, will be implemented on the first body 200, particularly, on the first rear case 225. In this configuration, the component(s) disposed on the first rear case 225 can be protected by the second body 205 in a closed position of the mobile terminal. In addition, without the camera 121 of the second body 205, the camera 121 of the first body 200 can be implemented to be rotatable so as to rotate up to a direction which the camera 121 of the second body 205 faces.

The mobile terminal 100 of FIGS. 1 to 3 may also be configured to operate within a communication system which transmits data via frames or packets, including both wireless and wireline communication systems, and satellite-based communication systems. Hereinafter, a communication system within which the mobile terminal related to the present invention can operate will be described with reference to FIG. 4. Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 4:
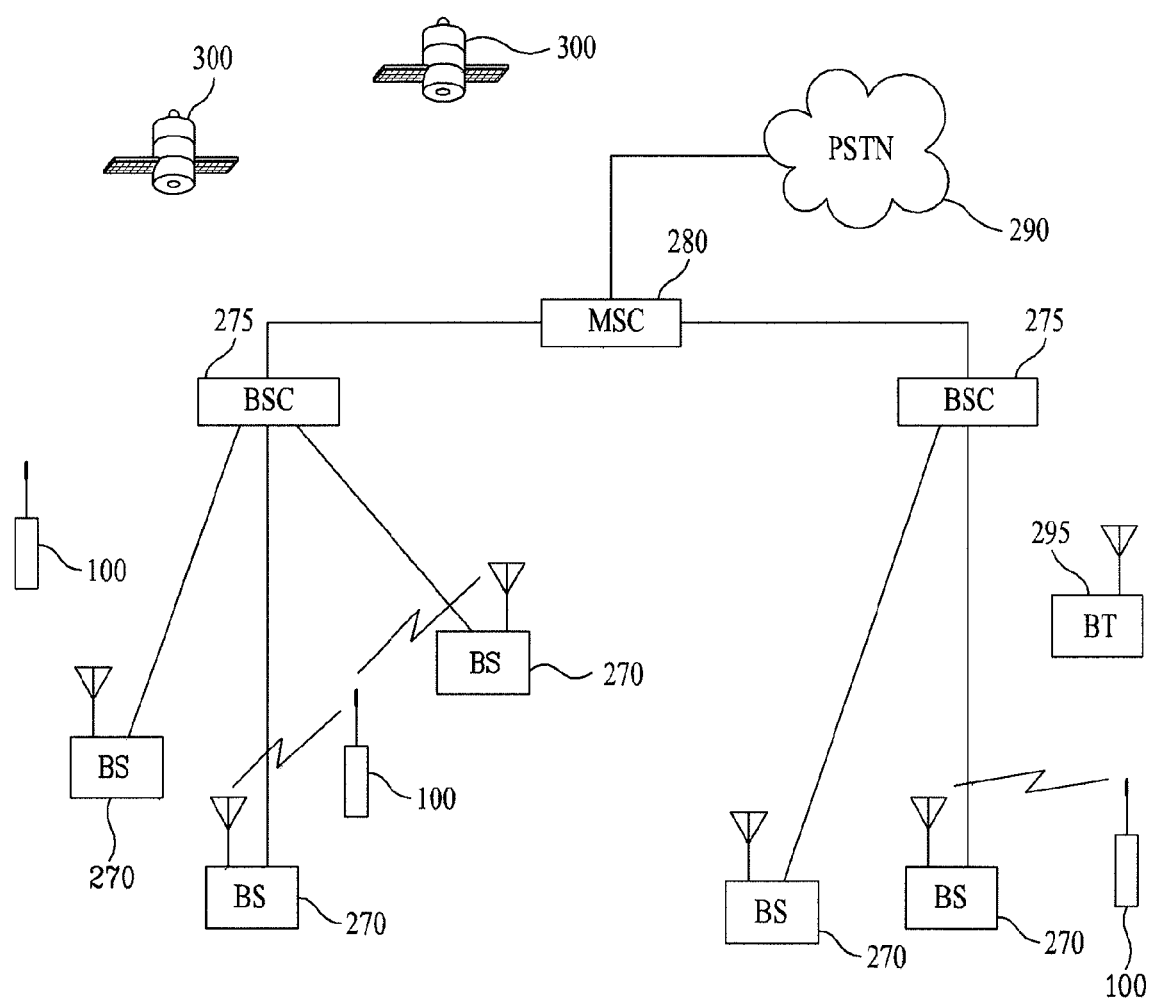
FIG. 4 is a block diagram of a wireless communication system with which a mobile terminal according to an embodiment of the present invention is operable.

Referring now to FIG. 4, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 4.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some instances, the term "base station" may be used to refer collectively to a BSC 275, and one or more base stations 270. The base stations may also be denoted as "cell sites." Alternatively, individual sectors of a given base station 270 may be referred to as cell sites. A broadcasting transmitter (BT) 295, as shown in FIG. 4, transmits a broadcast signal to the mobile terminals 100 operating within the system. The broadcast receiving module 111 (FIG. 1) can also be configured inside the mobile terminal 100 to receive broadcast signals transmitted by the BT 295.

FIG. 4 further depicts several Global Positioning System (GPS) satellites 300. Such satellites 300 facilitate locating the position of at least one of plural mobile terminals 100. Two satellites are depicted in FIG. 4, but it is understood that useful position information may be obtained with greater or fewer satellites than two satellites. The GPS module 115 (FIG. 1) can also be configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During an operation of the wireless communication system, the base stations 270 receive sets of reverse-link signals from various mobile terminals 100. The mobile terminals 100 are engaging in calls, messaging, and executing other communications, and each reverse-link signal received by a given base station 270 is processed within that base station 270. The resulting data is then forwarded to an associated BSC 275. Further, the BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

FIGS. 5A to 5J are overviews of display screens illustrating an event processing method using a mobile communication terminal according to one embodiment of the present invention. The following description assumes a message reception event takes place during a chatting session. In more detail, a party 'A' is chatting with a party 'B'. Further, the party 'A' receives a text message from a party 'C' as an example. In this instance, a name stored in a phonebook or a nickname used in the chatting session can be displayed on a chatting window. In particular, a message writer is displayed on a chatting screen to discriminate a message sent by a user from a message of a correspondent party. Further, the user is represented as the user's name, 'I' or 'my nickname' and a name or nickname of a chatting correspondent party is displayed on the chatting screen. Moreover, a received message can include multimedia data as well as a text message.

Figure 5A:
FIGS. 5A to 5J are overviews of display screens illustrating an event processing method using a mobile communication terminal according to one embodiment of the present invention is displayed.
Figure 5B:
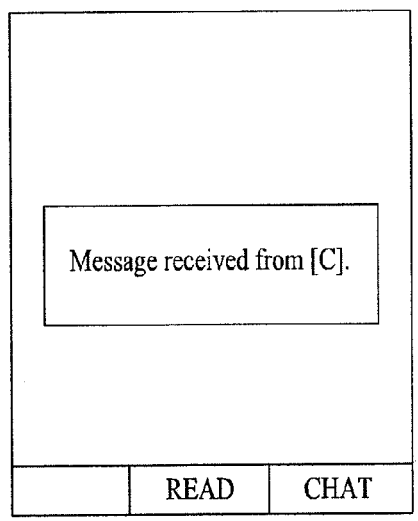
Figure 5C:
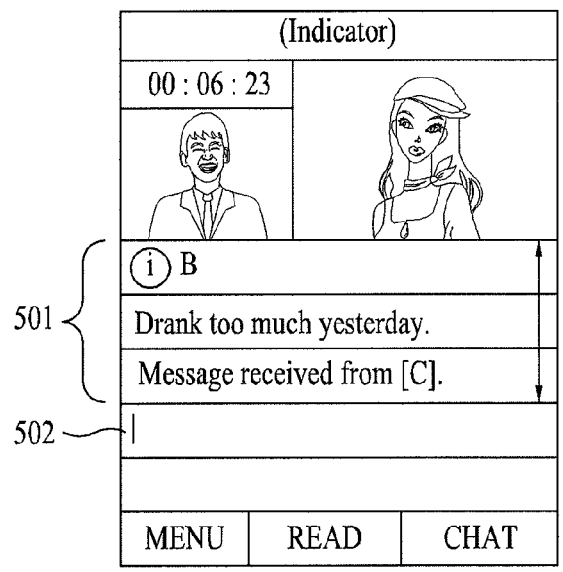
Figure 5D:
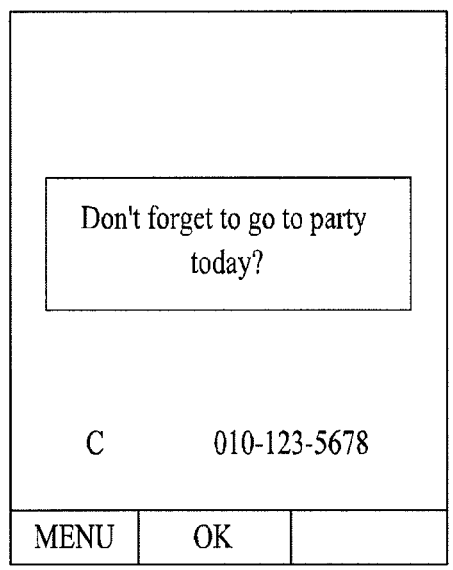

Referring to FIG. 5A, a display screen in the chatting session includes a chatting screen 501 for displaying conversation exchanged with a chatting correspondent party and a chatting input window 502 for inputting a content to be forwarded to the correspondent party. In addition, various events may occur during the chatting session. Embodiments of the present invention relate to a method of processing an event having text information among the various events. In particular, a message event such as a short message, a multimedia message and the like or an event such as an alarm according to a schedule management and the like is possible (e.g., external events are received during the chatting session). For instance, if a message is received, a presence of a message reception is displayed as a pop-up status as shown in FIG. 5B. Also, a presence of the message reception can be displayed on the chatting screen 501 as shown in FIG. 5C.

Figure 5E:
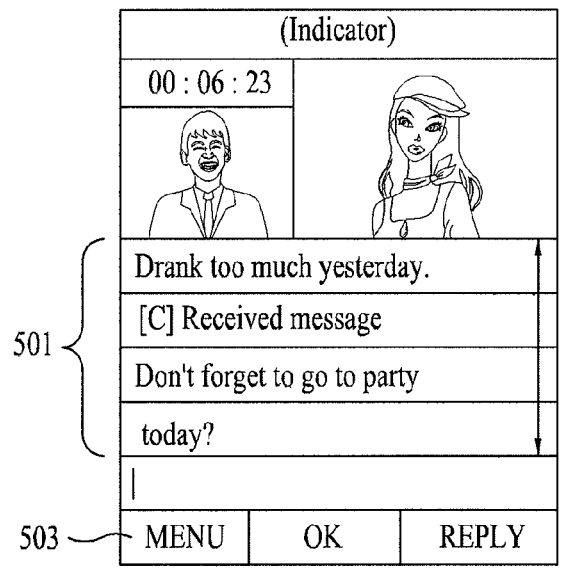

In addition, a menu button can be displayed to handle a user's action for the received message. For example, a button 'Read' can be provided to read a reception content, a button 'Chatting' can be provided for attempting to read a corresponding message in the future if the message is not an important message after checking a text message sender. Also, each selection can be implemented by a direct touch or a proximity touch. If the button 'Read' is selected, a content of a received message is displayed. For example, a received message is displayed in a pop-up screen status shown in FIG. 5D. In another example, a content of a received message can be displayed on the chatting screen 501, as shown in FIG. 5E, while the chatting session is maintained. After the user has read the information, the user can select an 'OK' button to reenter the chatting screen.

Figure 5F:
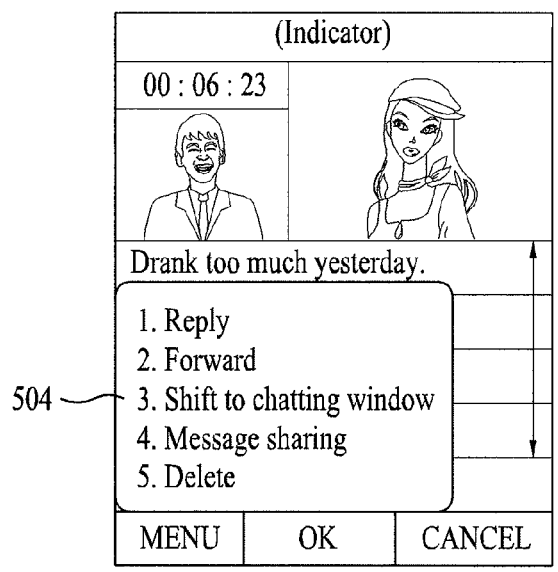

In addition, as shown in FIG. 5E, a menu key 503 can be provided. Then, if the user selects the menu key 503, the controller 180 controls the display 151 to display a pop-up window 504 including a plurality of menu items as shown in FIG. 5F. Thus, the user can select a variety of functions (e.g., reply, forward, etc.) for the received. A menu option for shifting to a chatting window and a message sharing menu can also be displayed as well as the general reply, forward and delete functions for a received message.

Figure 5G:
Figure 5H:

Thus, if the user selects the reply menu option, a text message writing screen is entered so that the user can write text. Thus, the user can input a replay message via the chatting input window 502 as shown in FIG. 5G and then send the replay message to the other party that sent the message by selecting a 'Send' button. An indication that the message has been successfully sent can also be displayed on the chatting screen 501 as shown in FIG. 5H. A processing according to a selection for a delete menu or a forward menu is performed in a similar manner.

Figure 5I:
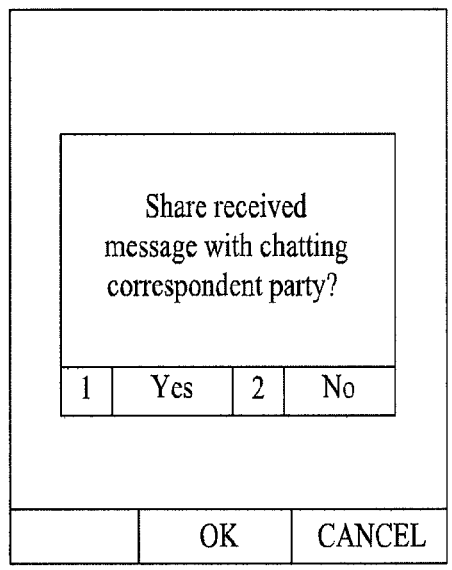

If the user selects the 'message sharing' menu option, a message received from 'C' during the chatting session can be shared with the chatting correspondent party 'B'. In this instance, a menu option for querying whether to share the received message can be displayed as shown in FIG. 5I. The received message can also be displayed in a manner that the received message is shared through the chatting screen of the chatting correspondent party without a separate guide option according to a menu selection.

Figure 5J:
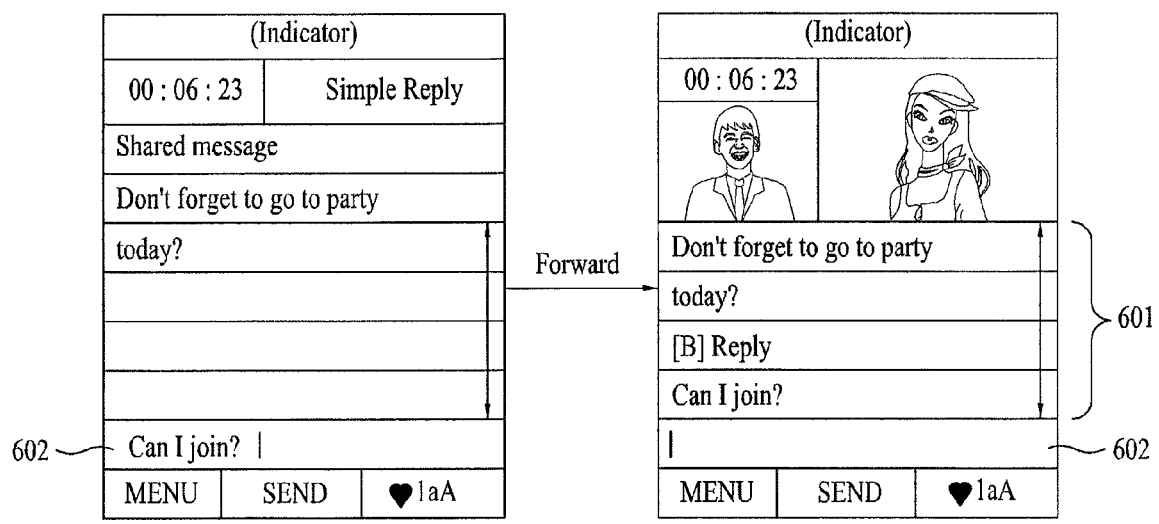

Next, FIG. 5J illustrates a display screen displayed on a terminal of the party 'B' who is chatting with the party 'A'. Referring to FIG. 5J, if the party 'A' receives a message written by the party 'C' and then selects the message sharing menu option, information can be displayed on the chatting screen 601 of the party 'B' indicating the shared menu option has been selected by the party 'A'. In this instance, the message sender information is displayed together with the message content. Further, the terminal of the party 'B' of a chatting correspondent party can share the received message and can also make a reply to the shared message. In particular, a reply function to the shared message can be performed using a menu button.

Then, if the party 'B' selects a reply message writing in response to the shared message using the appropriate menu button or option, a general message writing screen is displayed or a message can be input via the chatting input window 602 of the party 'B', as shown in FIG. 5J. In this instance, a 'Send' option is provided. Further, a message input via the chatting input window 602 is sent to the party 'C' who is the sender of the shared message according to a selection for the 'Send' option. The sent information can then be displayed on the chatting screen 601 of the party 'B' and/or the chatting screen 501 of the party 'A'.

Figure 6:
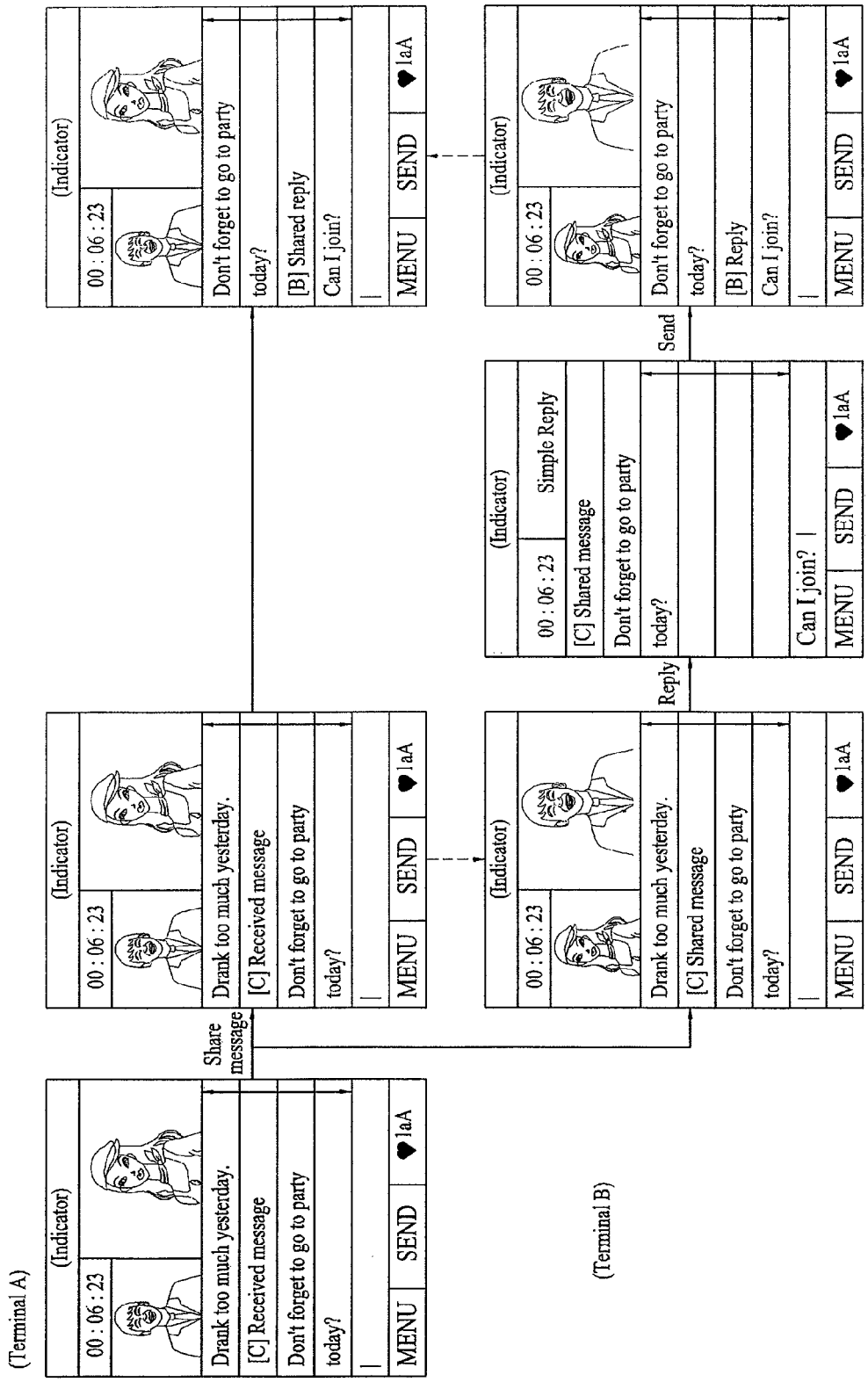
FIG. 6 includes overviews of display screens illustrating simultaneous screens of chatting terminals.

Next, FIG. 6 includes overviews of display screens illustrating simultaneous screens of the two chatting terminals explained in the above description. Referring to FIG. 6, when the party 'A' receive a message during the chatting session and determines to share the received message, the received message is displayed on the chatting screen 601 of the chatting correspondent party B as well as the chatting screen 501 of the party 'A'. In this instance, if the party 'B' selects a reply to the shared message via a menu option, a message can be input via the chatting input window 602 of the party 'B'. After completion of the message writing, if the party 'B' presses a button 'Send', the written message is sent to party 'C'. The sent message information is then displayed on the chatting screen 601 of the party 'B'. If the party 'B' selects a sent message sharing using a menu button or according to a setup, the sent message information can be displayed on the chatting screen 501 of the party 'A' as well. In this instance, the sent message is forwarded as a short message or a multimedia message to the party 'C'.

Figure 7A:
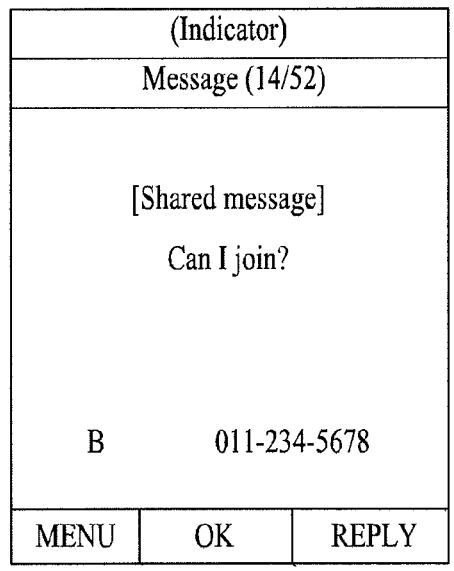
FIGS. 7A to 7C are overviews of display screens illustrating a screen of a terminal C and screens of two chatting terminals.
Figure 7B:
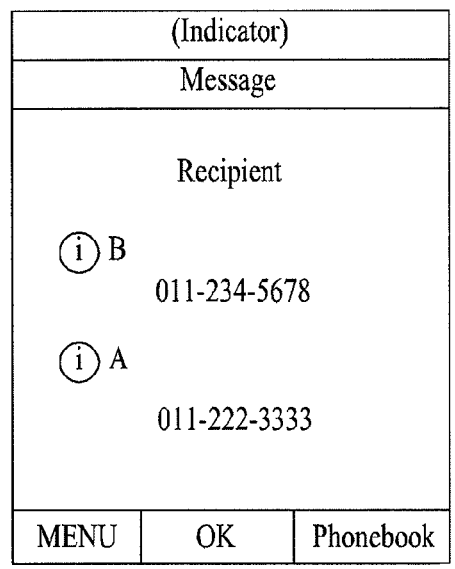
Figure 7C:
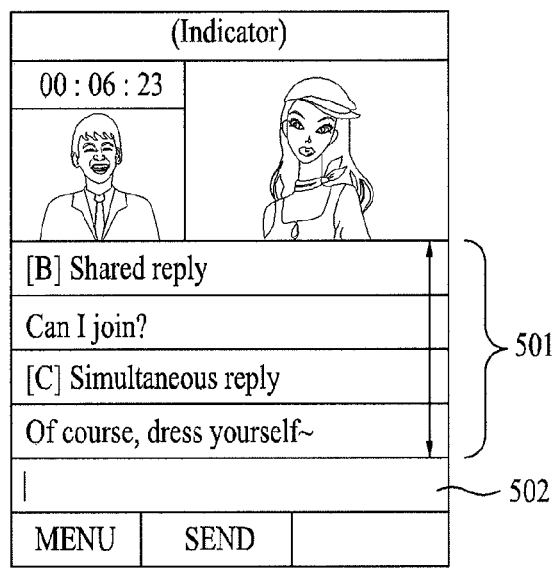
Figure 7C:
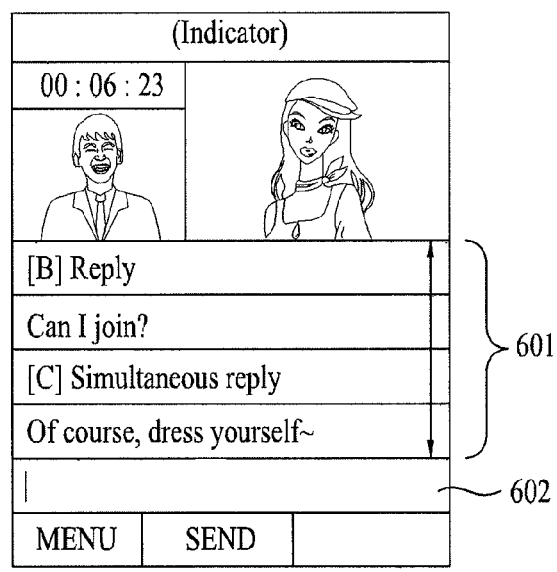

FIGS. 7A to 7C are overviews of display screens illustrating a screen of the party 'C' having sent a message to the party 'A' and screens of two chatting terminals. Referring to FIG. 7A, a message received from the party 'B' is displayed. Referring to FIG. 7B, if the party 'C' selects the 'Reply' option, information on a receiver is input according to a general message writing sequence, a message is input, and the message is then sent. If the user selects a 'Simultaneous Reply' option (not shown in the drawing), the user can operate a menu function to enable a reply to be simultaneously sent to both a current chatting correspondent party and the sender, i.e., the party 'B' of the currently received message.

In addition, if the party 'C' having received the message from the party 'B' selects the 'Simultaneous Reply' option, the corresponding message is displayed on the two terminals. Unlike FIG. 6, in which the message sent to the party 'B' is shared with the party 'A' according to the selection made by the party 'B', and if the party 'C' selects the 'Simultaneous Reply' option, information such as 'simultaneous reply' can be displayed on screens of the two terminals as shown in FIG. 7C. In addition, a short or multimedia message written by the party 'C' is simultaneously forwarded to the party 'B' or to both of the parties 'A' and 'B'. Therefore, the party 'A' can check the reply of the party 'C' in response to the reply of the party 'B'. The message received from the party 'C' is also displayed on each user chatting screen 501/601. Further, the party 'C' can select a recipient in a format of an individual reply or a simultaneous reply.

Figure 8:
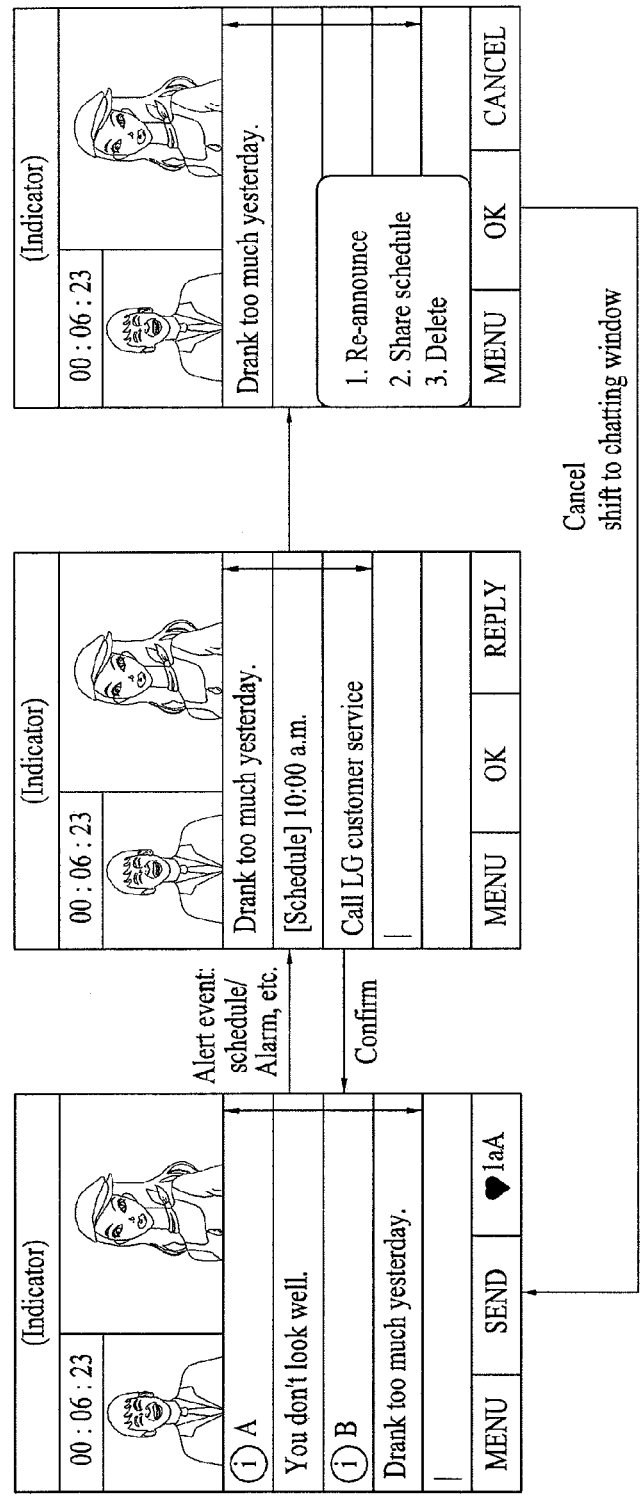
FIG. 8 includes overviews of display screens illustrating an event processing method using a mobile communication terminal according to another embodiment of the present invention.

Next, FIG. 8 includes overviews of display screens illustrating an alarm occurring by a schedule management event during the chatting session. Referring to 8, an event occurrence is displayed on the chatting window 501 in the same manner of the message reception. A detailed schedule content is also output as a text to the chatting screen 501. If the user checks the schedule, the chatting screen is re-entered. In this instance, a menu, a pop-up widow for selecting a menu 're-announcement', 'schedule sharing' or 'delete' can also be provided. Meanwhile, a process for handling the schedule sharing is performed in a similar manner as the above-described received message sharing process.

In addition, as chatting information is shared between two terminals, information on a chatting content, a chatting correspondent party, a chatting time and the like can be stored. This stored data can be utilized as data for providing statistical information required from a terminal in the future.

Thus, in embodiments of the present invention, an application driving unit is provided to implement chatting with a correspondent terminal. Chatting information is displayed via a display unit according to an operation of the application driving unit. The controller 180 controls information of an event, which takes place during the chatting session, to be displayed on a chatting screen while maintaining the chatting session displayed on the display unit. A user's selection signal is also forwarded to the controller via a signal input unit.

Accordingly, a mobile communication terminal and corresponding event processing method according to embodiments of the present invention provides several advantages. For example, when an event requiring a text display occurs during the chatting session, the text display according to the event occurrence can be performed while a chatting screen is maintained.

Further, a reply to a received message can be written via a chatting screen, and a received message can be shared with a correspondent party in chatting. Also, a chatting correspondent party can forward a message to a sender of a message received during the chatting session.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal comprising:
a wireless communication unit configured to wirelessly communicate with at least one other terminal;
a messenger service application driving unit configured to implement a chatting session between a first user of the mobile terminal and a second user of the at least one other terminal;
a display unit configured to display a chatting screen including chatting information exchanged between the first user of the mobile terminal and the second user of the at least one other terminal during the chatting session; and
a controller configured to:

receive, via the wireless communication unit, an external incoming message from a third user that is external to the chatting session between the first and second users,
control the display unit to display an indication within the chatting screen along with the chatting information about the received incoming message,
receive an input request signal requesting the external incoming message received by the mobile terminal be shared with the second user of the at least one other terminal, and
display contents of the received incoming message within the chatting information based on the received input request signal.

2. The mobile communication terminal of claim 1, wherein the chatting session comprises at least one a video chatting session and a text chatting session.

3. The mobile communication terminal of claim 1, wherein the display unit includes a touch screen, and
wherein the controller is further configured to control the display unit to display information input via the touch screen on the chatting screen of the at least one other terminal.

4. The mobile communication terminal of claim 1, wherein the message includes a short text message.

5. The mobile communication terminal of claim 1, wherein the message includes a multimedia message.

6. The mobile communication terminal of claim 1, wherein the controller is further configured to display a window allowing a reply message to be written on the chatting screen, and to send the reply message to a terminal that sent the message via the wireless communication unit.

7. The mobile communication terminal of claim 1, wherein the contents of the received message further include phone number information of a terminal that sent the message.

8. The mobile communication terminal of claim 1, wherein the message comprises a schedule management message.

9. A method of controlling a mobile communication terminal, the method comprising:
wirelessly communicating, via a wireless communication unit, with at least one other terminal;
implementing, via a messenger service application driving unit, a chatting session between a first user of the mobile terminal and a second user of the at least one other terminal using the wireless communication unit;
displaying, via a display unit, a chatting screen including chatting information exchanged between the first user of the mobile terminal and the second user of the at least one other terminal during the chatting session;
receiving, via the wireless communication unit, an external incoming message from a third user that is external to the chatting session between the first and second users;
displaying, on the display unit, an indication within the chatting screen along with the chatting information about the received incoming message;
receiving an input request signal requesting the external incoming message received by the mobile terminal be shared with the second user of the at least one other terminal; and
displaying, on the display unit, contents of the received incoming message within the chatting information based on the received input request signal.

10. The method of claim 9, wherein the chatting session comprises at least one a video chatting session and a text chatting session.

11. The method of claim 9, wherein the display unit includes a touch screen, and wherein the method further comprises displaying information input via the touch screen on the chatting screen of the at least one other terminal.

12. The method of claim 9, wherein the message includes a short text message.

13. The method of claim 9, wherein the message includes a multimedia message.

14. The method of claim 9, further comprising:
displaying a window allowing a reply message to be written on the chatting screen; and
sending the reply message to a terminal that sent the message via the wireless communication unit.

15. The method of claim 9, wherein the contents of the received message further include phone number information of a terminal that sent the message.

16. The method of claim 9, wherein the message comprises a schedule management event message.

17. The mobile communication terminal of claim 1, wherein the controller is further configured to control the display unit to display the contents of the external message based on the first user's instruction and not based on both of the first and second user's instructions.

18. The mobile communication terminal of claim 1, wherein the wireless communication unit and the messenger service application driving unit are different and independent modules.

19. The method of claim 9, wherein the displaying step displays the contents of the external message based on the first user's instruction and not based on both of the first and second user's instructions.

20. The method of claim 9, wherein the wireless communication unit and the messenger service application driving unit are different and independent modules.

* * * * *